United States Patent [19]

Wiesman

[11] 4,107,380
[45] Aug. 15, 1978

[54] NON-BLOCKING COATING COMPOSITION

[75] Inventor: Dale Clifford Wiesman, Neenah, Wis.

[73] Assignee: American Can Company, Greenwich, Conn.

[21] Appl. No.: 741,232

[22] Filed: Nov. 12, 1976

[51] Int. Cl.$^2$ .................... B32B 5/16; B32B 9/02; B65D 85/72
[52] U.S. Cl. ................ 428/327; 260/28.5 A; 260/28.5 AV; 260/29.6 RB; 260/897 B; 426/126; 426/127; 428/340; 428/348; 428/349; 428/352; 428/354; 428/355; 428/461; 428/463; 428/467; 428/484; 428/485; 428/516; 428/518; 428/520
[58] Field of Search ........... 260/29.6 RB, 897 B, 260/28.5 A, 28.5 AV; 428/240, 323, 327, 343, 348, 349, 355, 347, 402, 407, 484, 485, 515, 517, 518, 520, 521, 340, 352, 354, 516, 461, 463, 467; 427/407, 416, 195, 202

[56] References Cited

U.S. PATENT DOCUMENTS

| | | | |
|---|---|---|---|
| 3,400,008 | 9/1968 | Bleyle et al. | 260/28.5 R |
| 3,483,020 | 12/1969 | Giellerup | 428/349 |
| 3,574,669 | 4/1971 | Chase | 428/342 |
| 3,682,767 | 8/1972 | Britton | 428/518 |
| 3,692,568 | 9/1972 | Clark | 428/518 |
| 3,733,214 | 5/1973 | Stockhausen | 428/355 |
| 3,741,253 | 6/1973 | Brax et al. | 428/520 |
| 3,789,085 | 1/1974 | Kishimoto et al. | 260/897 B |
| 3,932,693 | 1/1976 | Shaw et al. | 428/518 |
| 3,933,702 | 1/1976 | Caimi et al. | 260/29.6 RB |

*Primary Examiner*—George F. Lesmes
*Assistant Examiner*—R. Eugene Varndell, Jr.
*Attorney, Agent, or Firm*—Robert P. Auber; Ira S. Dorman; Ernestine C. Bartlett

[57] ABSTRACT

A flexible packaging sheet material bearing a tacky wax composition coating and a non-blocking overcoating in the form of a continuous film of an ethylene-vinyl acetate copolymer which incorporates between 10 and 35 percent by weight of solid low to medium density polyethylene particles of a size smaller than about 50 microns.

8 Claims, No Drawings

NON-BLOCKING COATING COMPOSITION

BACKGROUND OF THE INVENTION

This invention relates to a heat-sealable wrapping material and in particular to such material having a non-blocking surface overcoating applied thereto. More specifically, the invention relates to a wrapping material including a flexible packaging material substrate such as paper, cellophane, or a composite laminated web coated on one side with a thermoplastic heat-sealable wax and elastomer composition which is normally somewhat tacky at room temperature and finally a non-blocking overcoating composition superposed on the surface of the heat-sealable wax composition.

Flexible packaging sheet materials employing a surface coating of a composition including a substantial percentage of petroleum waxes of both paraffin and microcrystalline types have long been utilized in the packaging industry because of their excellent combination of protective properties, low cost, freeness from taste and odor, heat-sealability and excellent appearance in terms of gloss and luster. Wax compositions utilized in many packaging applications include various modifying additives such as natural and synthetic rubbers, resins, polymers and the like, which alter many of the physical and protective properties of the coating in adapting it to specific applications. Of particular interest in the present invention are wax compositions adapted to the manufacture of coated wrappers for cheese and cheese products, the wrappers bearing coatings comprising petroleum waxes, primarily of the microcrystalline type, and a small percentage of an elastomer such as polyisobutylene, generally ranging from 3 to 20% of the total coating weight. These coatings, when applied to a flexible base sheet such as cellophane, metal foil or combinations of these materials with other sheet materials, yield heat-sealable wrappers having excellent protective properties for cheese packaging. The surfaces of the coatings are, however, slightly tacky at room temperature and the wrappers tend to stick together when sheets are stacked one on another or when a coated sheet material is stored in roll form. This sticking or "blocking" of the coated sheet materials presents a severe problem in the use of these wrappers and has necessitated the application to the coating surface of heretofore a release-treated interleave sheet, a dusting of a solid particulate, pulverulent tack-relieving material or an overcoating of a non-blocking composition applied in the form of a solution or suspension in a volatile organic solvent. Although all of these procedures have been more or less successful in relieving the blocking problems, they have suffered from one or more undesirable features including inconvenience, a deleterious effect on the heat-sealing qualities or transparency of the wrapper, or have involved the necessity for the removal of large quantities of volatile organic solvents, with the attendant problems relating to fire and health hazards and environmental pollution.

It is therefore an object of the present invention to provide an improved packaging material for use on cheese and other food items, the said packaging material having a non-blocking overcoating applied from an aqueous dispersion onto the surface of a normally tacky wax composition coated flexible packaging base sheet.

It is a further object to provide a flexible, wax composition coated cheesewrapper having a non-blocking overcoating of excellent transparency and heat-sealability without the use of substantial amounts of solvents which present hazards both to health and to the environment.

SUMMARY OF THE INVENTION

The present invention discloses a non-blocking overcoating composition which does not interfere with the heat-sealing qualities required of the wax composition and which does not transfer to the surface of the packaged product, the purpose of the invention being achieved without the necessity of applying the non-blocking components from solution in a volatile, organic solvent. It has now been found that a completely satisfactory non-blocking overcoating for tacky wax composition coated sheets may be achieved by applying on the surface thereof a thin film of an ethylene-vinyl acetate copolymer in the form of an aqueous dispersion, the dispersion also having suspended therein an effective amount of solid, powdered polyethylene of low to medium density, followed by evaporative removal of the aqueous suspension medium. If desired, the ethylene-vinyl acetate copolymer dispersion may also include a minor amount of a petroleum wax.

In some cases it may be desirable to add a low molecular weight alcohol such as isopropyl alcohol to the aqueous suspension to improve the wetting properties of the composition. The alcohol component, in any case, is less than 10% of the composition.

DETAILED DESCRIPTION OF THE INVENTION

To illustrate the principles of this invention, a cellophane sheet material coated with a normally tacky wax composition coating comprising 78% microcrystalline wax, 7% petrolatum and 15% polyisobutylene was overcoated with aqueous dispersions containing from 20 – 35% solids concentration of an ethylene-vinyl acetate copolymer (EVA) and having suspended therein in solid particulate form from 10 – 35% (solids basis) of powdered polyethylene having a density of between 0.91 and 0.94, a melt index of 5 – 25 and an average particle size of about 20 microns. Similar results may be obtained with low to medium density polyethylene particles as large as about 50 microns, although the 20 micron size is preferred.

The preferred ethylene-vinyl acetate copolymer for use in this invention has a melt index of from 28 – 30 and a vinyl acetate content of about 18%. Similar copolymers ranging in melt index from about 20 – 40 and vinyl acetate content from 18 – 30% may also be used with substantially comparable results.

All percentages given above are on a weight basis. The coating compositions were applied to the wax composition surface by means of an etched roll partially immersed in a bath of the aqueous suspension, the excess material being doctored from the roll in conventional manner. The aqueous medium was then removed by evaporation to leave a thin continous film of EVA on the surface of the wax composition, the EVA film also having evenly dispersed therethrough the solid granular particles of polyethylene.

Specific examples of the coating preparation, application and testing are set forth hereinafter.

EXAMPLE 1

The following non-blocking compositions were prepared by suspending solid particulate low density (D=0.924) polyethylene of an average particle size of 20 microns in an aqueous dispersion of an ethylene-vinyl acetate copolymer of about 28 melt index and having about 18% vinyl acetate content.

Table 1.

| COATING | COMPOSITION IN WEIGHT PERCENT* | | |
|---|---|---|---|
| | EVA | WATER | POLYETHYLENE |
| A | 30 | 70 | 0 |
| B | 27 | 70 | 3 (10)* |
| C | 24.6 | 70 | 5.4 (18)* |
| D | 20 | 70 | 10 (33)* |

*Figures in () show weight percent based on total solids content.

The respective dispersions were applied to the surface of a cellophane sheet bearing 40 lbs. per ream of a wax composition comprising 78% microcrystalline wax, 7% petrolatum and 15% polyisobutylene in an amount sufficient to leave, after evaporation of the fluid medium, 1.5 lbs. per ream of solids as an overcoating for the wax composition.

The coated and overcoated sheets were then subjected to tests to determine their tendency to block, or stick together when stored either in stacked or rolled form and were also tested for the strength of heat-seal which would be formed by placing the coated sheets in face to face relationship under specified conditions of temperature and pressure.

The blocking test was carried out by placing 5 inch by 8 inch samples of the coated sheets in face to back relationship under a 40 lb. weight for 40 hours at 100° F. The sheets were graded on a scale from 1 to 5, wherein a rating of 1 indicates no blocking, with the sheets falling apart on being lifted, 2 indicates no blocking, with only minimal adhesion of the sheets, 3 indicates no blocking with sheets being easily separable by peeling, 4 indicates some blocking with sheets being separable with some difficulty and 5 indicating a complete blocking of the sheets, which are substantially inseparable.

The heat-sealing test was carried out by placing the coated sides of the sheets in face to face relationship and applying a 10 lb. per square inch sealing pressure thereto at 225° F. for one second and then cooling the sealed sheet to room temperature. The strength of seal was measured at 73° F. on an Instron Testing Unit at a rate of 10 inches per minute pull speed, operating on a 1 inch wide strip of the heat-sealed sheet material.

Table 2.

| SEAL STRENGTH AND BLOCKING TEST RESULTS | | |
|---|---|---|
| COATING | SEAL STRENGTH IN LBS./IN. | BLOCKING TEST RATING |
| A | 1.5–2.0 | 4 |
| B | 1.5–2.0 | 3 |
| C | 1.5–2.0 | 2 |
| D | 1.0 | 1 |

It is apparent from the above test data that the presence of the finely divided particulate polyethylene in the non-blocking composition, in amounts in excess of about 3% by weight of the overall non-blocking composition, or about 10% of the total solids present in the aqueous suspension effectively increases blocking resistance without adversely affecting the seal strength of the coated sheet. Between about 15% and 30% of a particulate polyethylene of a density between about 0.91 and 0.94, based on the solids weight of the composition, is considered to be a preferred range, although amounts as high as 35% or higher may be used if desired, there being small advantage in terms of blocking resistance and an accompanying small decrease in seal strength at higher percentages.

The amount of non-blocking overcoating applied to the surface of the tacky wax composition may be varied by altering the solids composition of the overcoating dispersion, although it is to be understood that a similar degree of control could be obtained by varying the size and depth of the etched rolls in the rotogravure applicator roll or by use of some other equivalent method of application. It has been found that as little as 0.75 lb. of the preferred overcoating (solids basis) applied per ream (3,000 sq. ft.) of wax composition surface is sufficient to prevent blocking in tests which correlate well with conditions encountered in the normal warehouse storage of roll stock of the packaging material during the summer months in the United States. Application of up to about 4 lbs. of the overcoating per ream is satisfactory, although amounts in excess of about 2.5 lbs. per ream are generally unnecessary and economically undesirable. The most desirable range of application is considered to be between about 1.0 and 2.5 lbs. per ream.

EXAMPLE 2

An aqueous dispersion containing 31% solids concentration of a 75/25 blend of EVA (about 28 melt index and having an 18% vinyl acetate content) and a paraffin wax of 135° F. melting point was coated in the manner previously described on the same wax composition coated sheet to leave 1.25 lb. per ream (solids) of a non-blocking overcoating thereon. The coated sheet gave seal strength readings of 1.5 lb. per inch and had a blocking rating of 4.

Substitution of 25% of the solids content of the above composition by solid particulate low density polyethylene of an average particle size of 20 microns gave a composition which, coated and tested under similar conditions, had equivalent seal strength and a blocking rating of 2 to 3.

The overcoatings containing an appreciable percentage of paraffin wax tended to be somewhat hazy in appearance and were somewhat more difficult to handle due to a propensity to foam excessively.

The compositions of this invention are applicable to the overcoating of a variety of somewhat tacky heat-sealable coating compositions applied to a variety of substrates, whereby the blocking tendencies of the coated sheets are eliminated or substantially alleviated and the sealing properties remain unaffected or in some cases are enhanced. For example, the compositions of this invention have been used to impart non-blocking properties to extrudable hot melt adhesive compositions of petroleum wax, ethylene-vinyl acetate copolymer and tackifying resins, as shown in the following example, wherein an EVA dispersion containing particulate polyethylene was overcoated on the adhesive surface of a composite laminated sheet coated with an extrudable hot melt adhesive composition.

EXAMPLE 3

A laminated web containing successive layers of paper, polyethylene, aluminum foil and an ethyl acrylate polymer resin was extrusion-coated on the resin side with 8 – 10 lbs. per ream of an extrudable hot melt adhesive composition comprising:

35% ethylene vinyl acetate copolymer (0.5 melt index and having a vinyl acetate content of 28%)
15% paraffin wax (m.p. 145° F.)
10% butyl rubber 20% stabilized rosin ester
20% semi-microcrystalline wax (m.p. 155° – 160° F.)

The surface of a portion of the coated composite web was overcoated with 1.0 lb. per ream (solids basis) of an aqueous dispersion of EVA (18% vinyl acetate content, below 30 melt index) containing 39% EVA solids and 9% particulate low density polyethylene, the remainder being water and emulsifying agents. In this composition, the particulate polyethylene content, based on the total solids in the overall composition, was about 19%. After removal of the aqueous medium by evaporation, the adhesive coated sheet and the same sheet bearing the non-blocking overcoating over the adhesive were tested for blocking tendency and seal strength.

The blocking temperature is defined as that temperature at which sheets stacked in face to back relationship under 50 lbs. per square inch pressure for 18 hours cannot be separated from each other without substantial coating transfer to the uncoated side of the web when the pressure is relieved. Blocking temperature is conveniently measured on a gradient temperature block, one end being heated and the other held at a temperature lower than the blocking point of the sheet under test. Using a gradient temperature block, the blocking point of the adhesive coated sheet was found to be 930° F., whereas the overcoated adhesive coated sheet had a blocking temperature of 112° F.

The seal strengths of the adhesive coated control sheet and of the same sheet bearing the overcoating composition described above were tested by heat-sealing the coated sheets across the open mouths of cups constructed of polyacrylonitrile resin and of polystyrene resin, using a sealing temperature of 540° F. at 0.4 – 0.5 second dwell time and about 250 lbs. per square inch pressure. The cups bearing the membranes sealed thereto were then placed in a vacuum chamber and subjected to increasing degrees of vacuum until the seals of the membranes failed. The adhesive coated membrane failed at 17 lbs. of vacuum whereas the membrane carrying the overcoating over the ahdesive withstood up to 21 lbs. of vacuum before failure.

The above example clearly indicates that the compositions of this invention not only impart improved blocking resistance but in some cases also give increased seal strength to the tacky compositions over which they are coated.

In extensive tests wherein cheese was packaged in wrappers coated with the heat-sealable wax compositions hereinbefore described and overcoated with the non-blocking coatings of this invention there was no transfer to the surface of the cheese vacuum packaged in the overcoated wrapper, the cheese surface remaining completely free of any foreign material when the packages were opened after six months of storage under refrigerator conditions. All packages maintained a satisfactory vacuum for the test period. The protective properties of the wax composition coated sheet were unimpaired and the wrappers also exhibited low surface friction and superior performance in machine packaging operations. Furthermore, as amply demonstrated by the foregoing examples, the non-blocking compositions of this invention are useful as overcoatings for hot melt adhesive coatings applied to various base sheets comprising paper, paperboard, metal foil and composites thereof with synthetic plastic films to be used as labels or package closure webs in a variety of applications.

It is thought that the invention and its attendant advantages will be understood from the foregoing description and it will be evident that modifications may be made within the spirit of the invention, the embodiments herein described being exemplary rather than limiting.

I claim:

1. A flexible packaging sheet material bearing on its surface a coating of a normally tacky heat-sealable wax composition selected from the group consisting of (1) microcrystalline petroleum wax and polyisobutylene and (2) ethylene-vinyl acetate copolymer, petroleum wax and a tackifying resin, (3) microcrystalline wax, petrolatum and polyisobutylene and (4) ethylene-vinyl acetate copolymer, paraffin wax, butyl rubber, rosin ester and microcrystalline wax, there being applied to the surface of said wax composition coating, as a non-blocking overcoating, between 0.75 and 4.0 pounds per ream of a composition comprising (a) between 65 and 90 weight percent of an ethylene-vinyl acetate copolymer having a melt index between about 20 and 40 and a vinyl acetate content of between 18 and 30% and (b) between 10 and 35 weight percent of a particulate polyethylene having a density between about 0.91 and 0.94 and an average particle size of between about 20 and 50 microns evenly dispersed throughout the overcoating.

2. A coated sheet material according to claim 1 wherein the non-blocking overcoating is present in an amount between 1.0 and 2.5 lbs. per ream of coated sheet surface.

3. A coated sheet material according to claim 1 wherein said heat-sealable wax composition coating is an extrudable hot melt adhesive comprising an ethylene-vinyl acetate copolymer, a petroleum wax and a tackifying resin.

4. A coated sheet material according to claim 1 wherein the ethylene-vinyl acetate copolymer component has a melt index of about 28 and a vinyl acetate content of about 18%.

5. A coated sheet material according to claim 3 wherein said polyethylene has a density of about 0.924 and an average particle size of about 20 microns and said polyethylene comprises between 15 and 30% by weight of said overcoating.

6. A coated sheet material according to claim 1 wherein said flexible sheet material web comprises a member selected from the group consisting of cellophane, metal foil, paper, paperboard and composite laminates thereof.

7. A coated sheet material according to claim 6 wherein said heat-sealable wax composition coating comprises a microcrystalline petroleum wax and polyisobutylene.

8. A flexible packaging sheet material selected from the group consisting of (A) cellophane and (B) a laminated web comprising successive layers of paper, polyethylene and aluminum foil;

said material bearing on its surface a coating of a normally tacky heat-sealable wax composition selected from the group consisting of (1) microcrystalline petroleum wax and polyisobutylene and (2) ethylene-vinyl acetate copolymer, petroleum wax and a tackifying resin, said coated sheet material having applied to the surface of the wax coating, as a non-blocking overcoating, between about 0.75 and 4.0 lbs. per ream of a composition comprising (a) between about 65 and 90 weight percent of an ethylene-vinyl acetate copolymer having a melt index between about 20 and 40 and a vinyl acetate content of between about 18 and 30% and (b) between 10 and 35 weight percent of a particulate polyethylene having a density between about 0.91 and 0.94 and an average particle size of between about 20 and 50 microns evenly dispersed throughout the overcoating.

* * * * *